United States Patent [19]

Harper

[11] 3,862,062

[45] Jan. 21, 1975

[54] THERMOSETTING ACRYLIC POWDER OF AN ACRYLIC POLYMER HAVING LOW GLASS TRANSITION TEMPERATURE, CELLULOSE ACETATE BUTYRATE AND A CROSS-LINKING AGENT

[75] Inventor: Lee R. Harper, Media, Pa.

[73] Assignee: E. I. du Pont de Nemours and Company, Wilmington, Del.

[22] Filed: Dec. 20, 1972

[21] Appl. No.: 316,746

[52] U.S. Cl.................. 260/15, 117/21, 117/161 C, 117/161 K, 117/161 LN, 117/161 UZ, 117/161 UC, 117/161 UT, 117/166, 117/132 B, 260/17
[51] Int. Cl............................................. C08b 21/08
[58] Field of Search....... 260/15; 117/161 C, 161 K, 117/161 LN, 161 UZ, 161 UT, 161 UC, 166, 17, 21, 132 B

[56] References Cited
UNITED STATES PATENTS

| | | | |
|---|---|---|---|
| 3,058,951 | 10/1962 | Flowers | 260/45.5 |
| 3,265,645 | 8/1966 | Coney et al. | 260/15 |
| 3,429,840 | 2/1969 | Lowe et al. | 260/15 |
| 3,491,037 | 1/1970 | Keys et al. | 260/15 |
| 3,657,001 | 4/1972 | Parker | 260/15 |
| 3,713,872 | 1/1973 | Porter et al. | 117/75 |
| 3,758,635 | 9/1973 | Labana et al. | 260/836 |
| 3,784,501 | 1/1974 | Pettit | 260/31.6 |

Primary Examiner—Melvin Goldstein
Assistant Examiner—Edward M. Woodberry

[57] ABSTRACT

The thermosetting acrylic polymer powder coating composition comprises finely divided particles having a diameter of 1–100 microns when the powder particles are a blend of A. 50–80 percent by weight of an acrylic polymer of methyl methacrylate or styrene, an alkyl acrylate or an alkyl methacrylate having 2–12 carbon atoms in the alkyl group and a hydroxy alkyl acrylate or a hydroxy alkyl methacrylate each having 2–4 carbon atoms in the alkyl group;

wherein the acrylic polymer has a glass transition temperature of 50°C. to 70°C. and a weight average molecular weight of 5,000–25,000 and the polymer is hydroxyl terminated;

B. 5–30 percent by weight of cellulose acetate butyrate having a viscosity of 0.01–2.0 seconds and the butyryl content of 25–60 percent;

C. 5–19.95 percent by weight of an alkylated melamine formaldehyde resin that has 1–8 carbon atoms in the alkyl group; and D. 0.05–1 percent by weight of a blocked acid catalyst;

the powder composition can contain pigments and dyes;

the novel thermosetting powder coating composition is particularly useful as an exterior finish for automobiles, trucks, buses and other vehicles.

9 Claims, No Drawings

THERMOSETTING ACRYLIC POWDER OF AN ACRYLIC POLYMER HAVING LOW GLASS TRANSITION TEMPERATURE, CELLULOSE ACETATE BUTYRATE AND A CROSS-LINKING AGENT

BACKGROUND OF THE INVENTION

This invention is related to a powder coating composition and in particular to a thermosetting acrylic polymer powder coating composition.

Thermosetting powder coating compositions of epoxy resins are well known in the art as showwn in Elbling U.S. Pat. No. 3,039,987, issued June 19, 1962 and Winthrop et al. U.S. Pat. No. 3,102,043, issued Aug. 27, 1963. Thermosetting powder coating compositions of an epoxy resin, a polyvinyl acetal and a polyacrylate resin disclosed in Flowers et al. U.S. Pat. No. 3,058,951, issued Oct. 16, 1962. In general, epoxy powder coatings have poor outdoor durability and also poor appearance and thermosetting powder coatings in general have poor appearance caused by inadequate flow of the finish during baking which requires sanding and refinishing portions of the coated area.

The automobile and truck manufacturing industry intends to utilize powder coating compositions to reduce pollution but the industry demands that these compositions be of a high quality. The novel thermosetting acrylic polymer powder coating compositions of this invention provides a high quality, smooth, glossy, durable finish having an excellent appearance that does not require sanding and recoating to achieve these results. The composition meets the high quality standards required for truck and automobile exterior finishes.

SUMMARY OF THE INVENTION

The thermosetting acrylic powder coating composition of this invention comprises finely divided particles having a particle size of 1-100 microns; wherein the powder particles are an intimately mixed blend of film-forming constituents of
A. 50–80 percent by weight of an acrylic polymer of
  1. 50–80 percent by weight, based on the weight of the acrylic polymer, of methyl methacrylate or styrene or a mixture of methyl methacrylate and styrene;
  2. 10–35 percent by weight, based on the weight of an acrylic polymer, of an alkyl acrylate and an alkyl methacrylate or a mixture thereof, each having 2–12 carbon atoms in the alkyl groups;
  3. 10–40 percent by weight, based on the weight of the acrylic polymer, of a hydroxy alkyl acrylate or a hydroxy alkyl methacrylate each having 2–4 carbon atoms in the alkyl group;
wherein the acrylic polymer has a glass transition temperature of 50°C. to 70°C., a weight average molecular weight of 5,000–25,000 and is hydroxyl terminated;
B. 5–30 percent by weight of cellulose acetate butyrate that has a viscosity of 0.01–2 seconds measured according to ASTMD-1343-56 at 25°C. and has a butyryl content of 25–60 percent;
C. 5–19.95 percent by weight of an alkylated melamine formaldehyde resin that has 1-8 carbon atoms in the alkyl group; and
D. 0.05–1.0 percent by weight of a blocked acid catalyst.

DESCRIPTION OF THE INVENTION

The novel thermosetting acrylic powder coating composition of this invention has powder particles that preferably are 10–75 microns in diameter and has a glass transition temperature of 50° to 70°C.

The glass transition temperature of the powder particles is the temperature at which the viscosity of the material is $10^{13}$ poises.

The powder particles can be pigmented or unpigmented but usually contain 0.2–50 percent by weight of pigment. Any of the conventional inorganic pigments, organic pigments, dyes and lakes can be used in the novel powder coating composition of this invention.

About 50–80 percent by weight, based on the weight of the film-forming constituents in the powder coating composition, of an acrylic polymer is utilized and preferably, about 65–75 percent by weight of the acrylic polymer is used. The acrylic polymer has a weight average molecular weight of about 5000–25,000, and preferably, 8,000–15,000. The polymer has a number average molecular weight of about 2,000–8,000. The number average molecular weight and the weight average molecular weight of the polymer are determined by gel permeation chromotography using a standard "Lucite" 40 — polymethyl methacrylate.

The acrylic polymer is prepared by conventional solution, emulsion or bead polymerization techniques and by using conventional polymerization catalysts.

The acrylic polymer can be prepared by conventional solution polymerization techniques in which the monomer constituents are blended with solvents and a polymerization catalyst and the reaction mixture is heated to 55°–150°C. for about 2–6 hours to form a polymer that has a weight average molecular weight of about 5,000–25,000.

Typical solvents which are used to prepare the acrylic polymer are toluene, ethyl acetate, acetone, methylisobutyl ketone, methylethyl ketone, ethyl alcohol, and other aliphatic, cycloaliphatic and aromatic hydrocarbons, esters, ethers, ketones, and alcohols, such as are conventionally used. Solvents having a boiling point below 100°C. are preferred to facilitate spray drying of the composition to form the novel powder coating composition.

About 0.1–4 percent by weight, based on the weight of the monomers, of a polymerization catalyst is used to prepare the acrylic polymer. Typical catalysts are azo-bis($\alpha$,gammadimethyl-valeronitrile), benzoyl peroxide, t-butyl peroxy pivalate, azobisisobutyronitrile and the like. Up to about 5 percent by weight of a chain transfer agent can be used to control molecular weight such as dodecyl mercaptan, benzenethio or mercapto ethanol.

The acrylic polymer can be prepared by an emulsion polymerization process in which the monomers and an aqueous solution of a free radical catalyst are simultaneously and continuously fed into a polymerization vessel containing water, and a suitable emulsifying agent. The polymerization is carried out in a vessel equipped with a reflux condenser, preferably, under an inert atmosphere, utilizing polymerization temperatures of about 20°–90°C. Typical free radical catalysts that can be used are as follows: potassium persulfate, water-soluble peroxides, such as hydrogen peroxide. A redox type catalyst such as a mixture of ammonium persulfate and sodium bisulfite, is preferred. If a redox catalyst is used, 0.1–5 parts per million of iron, based on the weight of water, in the form of a soluble iron salt such as ferrous sulfate should be added to the reaction mixture. Any active anionic or nonionic surfactant or combination thereof can be used as an emulsifying agent. An ammonium or volatile amine salt of a sulfated or sulfonated surfactant, such as ammonium lauryl sulfate, is preferred.

The acrylic polymer can also be prepared by suspension or bead polymerization techniques as disclosed in W. R. Sorenson and T. W. Campbell, *Preparative Methods of Polymer Chemistry*, Interscience Publishers, New York, 2nd Ed. 1968, page 254.

The acrylic polymer utilized in the novel powder coating composition of this invention contains about 50–80 percent by weight of methyl methacrylate or styrene or a mixture of methyl methacrylate and styrene, 10–35 percent by weight of an alkyl acrylate or an alkyl methacrylate or a mixture thereof in which the alkyl groups contain 2–12 carbon atoms, and 10–40 percent by weight of a hydroxy alkyl acrylate or a hydroxy alkyl methacrylate each having 2–4 carbon atoms in the alkyl group. The polymer can also contain small amounts of $\alpha,\beta$-ethylenically unsaturated monocarboxylic acid, such as acrylic acid, methacrylic acid, in the amounts of about 0.01–1.0 percent by weight.

Typical alkyl acrylates, alkyl methacrylates having 2–12 carbon atoms that can be used to prepare the acrylic polymer are ethyl acrylate, propyl acrylate, isopropyl acrylate, butyl acrylate, isobutyl acrylate, hexyl acrylate, 2-ethylhexyl acrylate, nonyl acrylate and lauryl acrylate, ethyl methacrylate, propyl methacrylate, butyl methacrylate, hexyl methacrylate, 2-ethylhexyl methacrylate, nonyl methacrylate and lauryl methacrylate.

Typical hydroxy alkyl acrylates and methacrylates which can be used to prepare the acrylic polymer are 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, and the like.

One particularly useful acrylic polymer contains 60–75 percent by weight of methyl methacrylate, 10–30 percent by weight of an alkyl acrylate having 2–8 carbon atoms in the alkyl group and 10–20 percent by weight of a hydroxy alkyl acrylate or methacrylate has 2–4 carbon atoms in the alkyl group. Particularly preferred polymers contain methyl methacrylate/butyl acrylate/hydroxypropyl methacrylate in a weight ratio of 65/20/15 having a glass transition temperature of 55°C. and a weight average molecular weight of about 8,000–12,000; methyl methacrylate/butyl acrylate/hydroxypropyl methacrylate weight ratio 70/15/15 having a glass transition temperature of about 64°C.; and methyl methacrylate/butyl acrylate/hydroxypropyl methacrylate in a weight ratio of 65/25/10.

To obtain a hydroxy terminated acrylic polymer, a monohydroxyl chain terminating agent such as 2-mercaptoethanol or 3-mercapto-1,2-propanediol is utilized.

About 5–30 percent by weight of the film-forming constituents of the novel powder coating composition of this invention, of cellulose acetate butyrate is used. Preferably, 10–29 percent by weight of cellulose acetate butyrate is used and the cellulose acetate butyrate has a butyryl content of 25–60 percent by weight and a viscosity of 0.01–2 seconds measured according to ASTMD-1343-56 at 25°C. One useful cellulose acetate butyrate ester has a butyryl content of about 50–60 percent by weight and a viscosity of about 0.02–0.5 seconds. One highly preferred cellulose acetate butyrate ester used in this invention has a viscosity of 0.02 seconds and a butyryl content of about 55 percent by weight. The cellulose acetate butyrate ester provides resistance to popping on curing, improved cure and improved gloss.

About 5–19.95 percent by weight, based on the weight of the film-forming constituents of the novel powder composition, of an alkylated melamine formaldehyde resin having 1–8 carbon atoms in the alkyl group is used. These alkylated melamine formaldehyde resins are those that are well known in the art and are prepared by conventional techniques in which a lower alkyl alcohol such as methanol, ethanol, butanol, isobutanol, propanol, isopropanol, and the like is reacted with the melamine formaldehyde to provide pendent alkoxy groups.

One particularly preferred melamine used in this invention because of its stability in the powder and since it forms a high quality coating is hexa(methoxymethyl) melamine. "Cymel" 300 is one highly preferred hexa(methoxymethyl) melamine that can be used to form a powder coating composition with excellent resistance to popping and is used in amounts of 5–15 percent by weight of the powder coating composition.

To obtain adequate and rapid cross-linking of the novel thermosetting powder coating compositions of this invention, about 0.05–1 percent by weight, based on the weight of the film-forming constituents, of a blocked acid catalyst is utilized. Any acid catalyst can be used which can be blocked with an agent which breaks down under baking conditions to yield free acid. One particularly preferred composition is a blocked para-toluene sulfonic acid catalyst. A low molecular weight epoxy resin can be used as the blocking agent and this ester breaks down under baking conditions to provide free acid to catalyze the cross-linking reaction. "Epon" 812 which is an epoxy phenoxy polyether resin can be used. This resin has a Gardner Holdt viscosity of about C-F and an epoxide equivalent of 140–160. The epoxide equivalent is the grams of resin that contain 1 gram equivalent of epoxide.

Organic plasticizers can be used in the novel powder coating composition of this invention in amounts of 0–15 percent by weight, based on the weight of the film-forming constituents of the powder coating composition.

Monomeric and polymeric plasticizers can be used in the novel powder coating compositions of this invention. Phthalate ester plasticizers in particular the alkyl and cycloalkyl ester phthalates in which the alkyl group has 2–10 carbon atoms can be used as diethyl phthalate, dibutyl phthalate, butylbenzyl phthalate, dicyclohexyl phthalate, and mixtures thereof. Other esters such as diethyl adipate and sucrose benzoate can also be used.

Polyester resins can also be used as plasticizers. Typical polyesters are, for example, alkylene glycol esters of adipic and benzoic acid such as ethylene glycol adipate benzoate, neopentyl glycol adipate benzoate, ethylene glycol adipate benzoate phthalate and the like. Plasticizers of oil free or oil modified alkyd resins and polyesters and epoxidized soya bean oil can also be used.

Mixtures of the above polymeric plasticizers and monomeric plasticizers can be used such as a mixture of ethylene glycol adipate benzoate and diethyl phthalate, neopentyl glycol adipate benzoate and dibutyl phthalate and the like.

A silicone resin can be added to the novel powder coating composition of this invention to enhance flow and reduce cratering. Any of the conventional silicone resins or oils in amounts of 0.01–2 percent by weight can be used for this purpose.

Generally pigments are used in a powder coating composition of this invention in amounts of 0.2–50 percent by weight of the powder particles. Examples of the great variety of pigments which can be used in the novel powder coating composition of this invention are metallic oxide, preferably titanium dioxide, zinc oxide, iron oxide, and the like, metallic flakes, such as aluminum flake, metallic powders, metal hydroxides, "Afflair" pigments, for example, mica flake coated with titanium dioxide, sulfides, sulfates, carbonates, carbon black, silica, talc, china clay, and other pigments, organic dyes and lakes.

Pigments are often formed into pigment dispersions and are then utilized to prepare the novel coating composition of this invention. These pigment dispersions are prepared by conventional techniques, such as sand-grinding, pebble milling, the acrylic polymer solution or dispersion with pigments.

A two-roll mill can be used to prepare pigment chips which are formed into a pigment dispersion. Generally, pigments and cellulose acetate butyrate or the acrylic polymer along with a volatile non-solvent for the polymer and plasticizers are blended together and then the mixture is placed on a two-roll mill and the mixture is thoroughly milled to disperse the pigments and to form pigment chips. These chips are then dissolved in a solvent and blended with the acrylic polymer solution and the other constituents of the composition of this invention.

The novel powder coating composition of this invention is prepared by blending the acrylic polymer solution or emulsion with the cellulose acetate butyrate, the alkylated melamine formaldehyde resin, pigments or pigment dispersions, other additives, such as the aforementioned plasticizers and the blocked acid catalyst. This composition is then formed into a powder coating composition by using the following powder coating preparation techniques.

One method for forming a powder composition from the above prepared mixture is to charge the mixture into a vacuum extruder which flashes off the solvent or water and leaves a solid material which is then ground into powder particles. Commercial spray drying equipment can also be used for this technique. The powder is then passed through a sieve with openings of about 75 microns to remove large particles.

In another technique, the above prepared solution or dispersion can be charged into a vacuum extruder. The extruder is operated under a vacuum of about 22–25 inches of mercury, preferably, 10–15 inches in mercury, and the solvent or water is removed from the composition and a 100 percent solids extrudate is produced. The extrudate is then reduced to a powder using conventional grinding equipment, for example, a pin disc mill, a fluid energy mill or a hammer mill can be used. After grinding, the powder is passed through a sieve to remove large particles. Usually a 200 mesh sieve (74 micron size) is used.

A two-roll mill can also be used to disperse the pigment chips or pigment dispersion in the acrylic polymer dispersion or solution and the other additives. This composition is then ground to form the novel powder coating composition.

About 0.1–2.0 percent by weight of finely divided silica can be blended with the novel powder coating composition of this invention to eliminate caking of the powder and improve its handling and spraying properties.

The novel powder coating composition of this invention is then applied to a metal, glass, plastic or fiber reinforced plastic substrate by electrostatic spraying techniques or by using a fluidized bed or an electrostatic fluidized bed. Preferably, electrostatic spraying is utilized in which a voltage of 20 to 60 kilovolts is applied to the gun. The composition is applied in several passes to a thickness of 0.5–6 mils, preferably 2–3 mils, and then baked at 120°–180°C. for 15–30 minutes. One preferred bake is to bake the coating at about 130°–140°C. for about 10–20 minutes and then for about 25–35 minutes while increasing the temperature from 130°–170°C.

Preferably, the novel coating composition of this invention is applied over a suitably treated and primed metal substrate. Typical alkyd primers or epoxy primers pigmented with iron oxide, carbon black, titanium dioxide and the like can be used. Also, the novel composition can be used directly over galvanized or phosphatized steel to form a durable coating. An electrically conductive carbon black pigment can be added to the primer to make the surface conductive and promote uniform deposition of the powder while spraying.

Electrodeposited primers can be used on the metal substrate. Typical electrodeposited primer compositions have as the film-forming constituents about 50–95 percent by weight of a carboxylic acid polymer having an acid number of 5–200 and correspondingly about 5–50 percent by weight of a cross-linking agent.

The following are examples of carboxylic polymers used in these primer compositions; maleinized drying oils which are the reaction products of maleic anhydride and a drying oil such as linseed oil, dehydrated castor oil, tung oil, soya bean oil and the like; alkyd resins which are the reaction products of a polyhydric alcohol and a polybasic acid such as, drying oil fatty acids; esterified epoxy resins such as, an epoxy-hydroxy polyether resin esterified with conventional drying oil fatty acid which can be further acidified with maleinized drying oils; acrylic polymers; polyesters; trimellitic anhydride alkyd resins; styrene/allyl alcohol copolymers reacted with a carboxylic acid constituent and the like.

The following are typical cross-linking agents used with the above carboxylic polymers to form conventional primers and primers that can be electrodeposited: melamine formaldehyde, alkylated melamine formaldehyde, urea formaldehyde, benzoguanamine formaldehyde, toluene sulfonamide resins; one preferred cross-linking agent is hexa(methoxymethyl)melamine. Other cross-linking agents such as, amines and other compatible hydroxyl terminated compounds can also be used.

The following Examples illustrate the invention. All quantities are on a weight basis unless otherwise indicated.

EXAMPLE 1

A copolymer solution is prepared as follows:

|  | Parts by Weight |
|---|---|
| Portion 1 | |
| Methyl methacrylate monomer | 510.70 |
| Butyl acrylate monomer | 284.80 |
| 2-Hydroxypropyl methacrylate | 101.90 |
| Toluene | 134.60 |
| Methylethyl ketone | 241.90 |
| 2-Mercaptoethanol | 15.95 |
| Portion 2 | |
| Azo-bis-isobutyronitrile | 5.48 |
| Toluene | 106.70 |
| Methylethyl ketone | 53.30 |
| Portion 3 | |
| Methyl methacrylate monomer | 392.90 |
| 2-Hydroxypropyl methacrylate monomer | 105.80 |
| 2-Mercaptoethanol | 3.64 |
| Portion 4 | |
| Toluene | 18.30 |
| Methylethyl ketone | 23.80 |
| Total | 1,999.77 |

Portion 1 is premixed and charged into a reaction vessel equipped with a stirrer, thermometer, nitrogen inlet and a reflux condenser and a dropping funnel. Portion 1 is then heated to its reflux temperature.

Portion 2 is premixed and portions are added to the reaction mixture at 20 minute intervals over a 280 minute period until all of Portion 2 is added while maintaining the reaction mixture at its reflux temperature. Similarly Portion 3 is premixed and portions are added with Portion 2 at 20 minute intervals over the 280 minute period until all of Portion 3 is added while maintaining the reaction mixture at its reflux temperature and then the reaction mixture is refluxed for an additional 20 minutes.

Portion 4 is added and the polymer solution is cooled to room temperature. The resulting polymer solution has a Gardner Holdt viscosity of about Z-6 measured at 25°C. and a polymer solids content of about 73 percent.

The polymer has the following composition:
methyl methacrylate/butyl acrylate/2-hydroxy propyl methacrylate in a weight ratio of 65/20/15, and has a glass transition temperature of about 55°C., a number average molecular weight of about 5,000 and a weight average molecular weight of about 10,000.

A solution is then prepared by blending together the following ingredients:

|  | Parts by Weight |
|---|---|
| Polymer Solution (prepared above) | 194.0 |
| Cellulose acetate Butyrate (0.02 seconds viscosity measured according to ASTMD-1343-56 at 25°C. and a butyryl content of 55% by weight) | 40.0 |
| Acetone | 80.0 |
| "Cymel" 300 [hexa(methoxymethyl) melamine] | 24.0 |
| Silicone L-522 anticratering agent (low viscosity silicone oil) | 1.0 |
| Acid catalyst solution* | 2.5 |
| Total | 341.5 |

* Acid catalyst solution - blend of 32 parts of Epon 812, 4 parts of para-toluene sulfonic acid and 64 parts of isopropanol; Epon 812 - epoxy hydroxy polyether resin having a Gardner Holdt viscosity at 25°C. of C-F and an epoxide equivalent of 140-160.

The above solution is spray dried by spraying the solution into a container under 80 pounds per square inch pressure. One end of the container is covered with a nylon 140 mesh cloth to retain the powder particles while the opposite end of the container has a small opening through which the solution is sprayed. A white relatively uniform non-sticky powder is obtained. The powder is then placed in a vacuum dryer for 24 hours. The powder is then passed through a 53 micron sieve.

The powder is then sprayed onto a 20 gauge phosphatized steel panel using a Model 322 Ransburg Electrostatic Powder Gun. The powder is delivered from a reservoir to the gun by means of a stream of air. The gun utilized 40 kilovolts of electricity to charge the powder particles and 60 pounds per square inch air pressure. The panels are baked for 30 minutes at 150°C. The film on the panel is clear, and has a good appearance, and is free of popping and cratering and has a fine, orange peel surface which is acceptable. The thickness of the film is 2.0–2.4 mils and the film has a hardness of 14 Knoops. The film has excellent resistance to aromatic solvents and passes 15 cycles of the humidity-cold crack test without failure.

EXAMPLE 2

A copolymer solution is prepared as follows:

|  | Parts By Weight |
|---|---|
| Portion 1 | |
| Methyl methacrylate monomer | 548.00 |
| Butyl acrylate monomer | 209.00 |
| 2-Hydroxypropyl methacrylate monomer | 101.90 |
| Toluene | 134.60 |
| 2-Mercaptoethanol | 15.95 |
| Methylethyl ketone | 241.90 |
| Portion 2 | |
| Azo-bis-isobutyronitrile | 5.48 |
| Toluene | 106.70 |
| Methylethyl ketone | 53.30 |
| Portion 3 | |
| Methyl methacrylate monomer | 427.90 |
| 2-Hydroxypropyl methacrylate monomer | 105.80 |
| 2-Mercaptoethanol | 3.64 |
| Portion 4 | |
| Methylethyl ketone | 59.29 |
| Total | 2,013.46 |

The polymerization equipment and procedure described in Example 1 is used to prepare the polymer solution. The resulting polymer solution has a Gardner Holdt viscosity of M measured at 25°C. and a polymer solids content of about 55 percent.

The polymer has the following composition:
Methyl methacrylate/butylacrylate/2-Hydroxypropyl methacrylate in a weight ratio of 70/15/15 and
the polymer has a glass transition temperature of 64°C. and a number average molecular weight of about 5,000.

A solution is then prepared by blending together the following ingredients:

|  | Parts By Weight |
| --- | --- |
| Polymer solution (prepared above) | 473 |
| "Cymel" 300 [hexa(methoxymethyl) melamine] | 48 |
| Cellulose Acetate butyrate (described in Example 1) | 80 |
| Acetone | 160 |
| Silicone L-522 anticratering agent (low viscosity silicone oil) | 2 |
| Acid catalyst solution (described in Example 1) | 10 |
| Mill base (60.2% solids - titanium dioxide pigment and yellow iron oxide pigment in a 1.6:1 weight ratio dispersed in the above polymer solution, pigment to binder ratio 200:100) | 100 |
| Total | 873 |

The above solution is diluted to a spray viscosity (35 seconds No. 1 Zahn Cup) with methylene chloride. The resulting solution is spray dried and vacuum dried as in Example 1. The powder is then passed through a 270 mesh sieve.

The powder is then sprayed onto an aluminum panel and onto a phosphatized steel panel using the powder spray gun and application conditions of Example 1. Each panel is then baked for 15 minutes at 135°C. and then for 30 minutes at a programmed bake which increases from 135°C. The resulting panels have a finish that has excellent appearance and is free from popping and cratering. The panels have a 20° gloss of 76, a definition of image of 6–7, a hardness of 11 Knoops and pass 15 cycles of the humidity cold crack test without failure of the finish.

What is claimed is:

1. A thermosetting acrylic powder coating composition comprising finely divided particles having a particle size of 1–100 microns; wherein the powder particles are an intimately mixed blend of film-forming constituents that consist essentially of
   A. 50–80 percent by weight of an acrylic polymer consisting essentially of
      1. 50–80 percent by weight, based on the weight of the acrylic polymer, of methyl methacrylate or styrene or a mixture of methyl methacrylate and styrene;
      2. 10–35 percent by weight, based on the weight of the acrylic polymer, of an alkyl acrylate or an alkyl methacrylate or a mixture thereof each having 2–12 carbon atoms in the alkyl groups;
      3. 10–40 percent by weight, based on the weight of the acrylic polymer, of a hydroxy alkyl acrylate or a hydroxy alkyl methacrylate each having 2–4 carbon atoms in the alkyl group;
   wherein the acrylic polymer has a glass transition temperature of 50°C. to 70°C., a weight average molecular weight of 5,000–25,000 and is hydroxyl terminated;
   B. 5–30 percent by weight of cellulose acetate butyrate having a viscosity measured according to ASTMD-1343-56 of 0.01–2 seconds and a butyryl content of 25–60 percent;
   C. 5–19.95 percent by weight of an alkylated melamine formaldehyde resin having 1–8 carbon atoms in the alkyl group; and
   D. 0.05–1.0 percent by weight of a blocked acid catalyst.

2. The powder coating composition of claim 1 containing about 0.2–50 percent by weight of pigment.

3. The powder coating composition of claim 2 in which the acrylic polymer has a weight average molecular weight of 8,000–15,000.

4. The powder coating composition of claim 3 in which the alkylated melamine formaldehyde resin is hexa(methoxymethyl) melamine.

5. The coating composition of claim 4 in which the cellulose acetate has a viscosity of 0.02–0.5 seconds and a butyryl content of 50–60 percent by weight.

6. The coating composition of claim 5 in which the acrylic polymer consists essentially of 60–75 percent by weight of methyl methacrylate, 10–30 percent by weight of an alkyl acrylate having 2–8 carbon atoms in the alkyl group, and 10–20 percent by weight of hydroxyethyl acrylate or hydroxy propyl methacrylate.

7. The thermosetting acrylic polymer powder coating composition of claim 1 comprising finely divided particles having a particle size of 10–75 microns; with a powder particle containing 0.2–50 percent by weight pigment and an intimately mixed blend of film-forming constituents consisting essentially of
   A. 65–75 percent by weight of an acrylic polymer consisting essentially of
      1. 60–75 percent by weight of methyl methacrylate,
      2. 10–30 percent by weight of an alkyl acrylate having 2–8 carbons in the alkyl group,
      3. 10–20 percent by weight of hydroxyethyl acrylate or a hydroxypropyl methacrylate;
   wherein the acrylic polymer has a glass transition temperature of 50°C. to 70°C. and a weight average molecular weight of 8,000–15,000;
   B. 10–29 percent by weight of cellulose butyrate having a viscosity of 0.02–0.5 seconds and a butyryl of 50–60 percent;
   C. 5–15 percent by weight of hexa-(methoxymethyl) melamine;
   D. 0.05–1.0 percent by weight of paratoluene sulfonic acid blocked with a low molecular weight epoxy resin.

8. The powder coating composition of claim 7 in which the acrylic polymer consists of 65 percent by weight methyl methacrylate, 20 percent by weight butyl acrylate and 15 percent by weight of hydroxypropyl methacrylate having a glass transition temperature of 55°C. and a weight average molecular weight of about 8,000–12,000.

9. The powder coating composition of claim 7 in which the acrylic polymer consists of 70 percent methyl methacrylate, 15 percent butyl acrylate and 15 percent hydroxy propyl acrylate and has a glass transition temperature of about 64°C. and a weight average molecular weight of about 8,000–12,000.

* * * * *